United States Patent
Suggs et al.

(10) Patent No.: US 9,665,381 B2
(45) Date of Patent: May 30, 2017

(54) COMBINING INTERFACES OF SHELL APPLICATIONS AND SUB-APPLICATIONS

(75) Inventors: Bradley N. Suggs, Sunnyvale, CA (US); Immanuel Amo, Redwood City, CA (US); Chandar K. Oddiraju, Santa Clara, CA (US); Oluf Nissen, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 819 days.

(21) Appl. No.: 13/002,983

(22) PCT Filed: Aug. 29, 2008

(86) PCT No.: PCT/US2008/074785
§ 371 (c)(1),
(2), (4) Date: Jan. 6, 2011

(87) PCT Pub. No.: WO2010/024820
PCT Pub. Date: Mar. 4, 2010

(65) Prior Publication Data
US 2011/0119684 A1    May 19, 2011

(51) Int. Cl.
*G06F 3/0481* (2013.01)
*G06F 3/0482* (2013.01)
(Continued)

(52) U.S. Cl.
CPC ........ *G06F 9/4443* (2013.01); *G06F 9/45512* (2013.01); *G09G 5/363* (2013.01); *G09G 2360/125* (2013.01)

(58) Field of Classification Search
CPC .... G06F 3/0481; G06F 3/0482; G06F 3/0483; G06F 9/4443; G06F 3/04847; G06F 3/04871; G06Q 10/10
(Continued)

(56) References Cited

U.S. PATENT DOCUMENTS 6,734,873 B1 * 5/2004 Herf et al. ............. 345/629
6,871,348 B1   3/2005 Cooper
(Continued)

FOREIGN PATENT DOCUMENTS

| CN | 1932761 A | 3/2007 |
|---|---|---|
| JP | 2004-259216 | 9/2004 |
| KR | 10-2002-0083378 | 11/2002 |

OTHER PUBLICATIONS

IPO, Office Action dated Aug. 10, 2012, in counterpart GB Pat App. No. 1103179.6, filed Feb. 24, 2011.
(Continued)

*Primary Examiner* — Mark A Radtke
*Assistant Examiner* — Erik Stitt
(74) *Attorney, Agent, or Firm* — HP Inc. Patent Department

(57) ABSTRACT

A system comprises storage that includes a shell application and a sub-application that is adapted to provide a functionality to the shell application. The system also comprises processing logic coupled to the storage and adapted to execute the shell application and the sub-application. The processing logic generates a first graphical user interface (GUI) using the sub-application and generates a second GUI using the shell application. The processing logic displays on a display the first GUI superimposed onto the second GUI. The processing logic captures input provided using the first GUI and provides the input to the sub-application.

20 Claims, 3 Drawing Sheets

(51) Int. Cl.
*G06F 3/0483* (2013.01)
*G06Q 10/10* (2012.01)
*G06F 9/44* (2006.01)
*G06F 9/455* (2006.01)
*G09G 5/36* (2006.01)

(58) Field of Classification Search
USPC ........................................ 715/764, 810, 755
See application file for complete search history.

(56) References Cited

U.S. PATENT DOCUMENTS

| | | | |
|---|---|---|---|
| 7,165,099 B2* | 1/2007 | Sprigg et al. | 709/219 |
| 7,369,975 B2 | 5/2008 | Ramanathan | |
| 2003/0052906 A1* | 3/2003 | Lau et al. | 345/700 |
| 2003/0079052 A1* | 4/2003 | Kushnirskiy | 709/328 |
| 2005/0188329 A1 | 8/2005 | Cutler | |
| 2005/0223100 A1* | 10/2005 | Chen et al. | 709/228 |
| 2007/0043456 A1 | 2/2007 | Clark | |
| 2008/0215438 A1* | 9/2008 | Muthugopalakrishnan et al. | 705/14 |
| 2009/0288098 A1* | 11/2009 | Abd-El-Malek et al. | 719/312 |
| 2013/0159394 A1* | 6/2013 | Labour et al. | 709/203 |

OTHER PUBLICATIONS

WIPO, International Search Report, Mailed Apr. 27, 2009, PCT/US2008/074785 filed Aug. 29, 2008.
Hardware Overlay, Wikipedia, the free encyclopedia, Aug. 26, 2008, pp. 1-3, Available at: <en.wikipedia.org/w/index.php?title=Hardware_overlay&oldid=234432222>.
Office Action, German Application No. 112008003965.8 , Date of Issuance: Apr. 23, 2014, pp. 1-16.
Rob Pike, "A Concurrent Window System," AT&T Bell Laboratories, Spring 1989, pp. 133-153, Computing Systems, vol. 2, No. 2.
Stacking Window Manager, Wikipedia, the free encyclopedia, Aug. 27, 2008, pp. 1-4, Available at: <en.wikipedia.org/w/index.php?title=Stacking_window_manager&oldid=234588057>.
Touchscreen, Wikipedia, the free encyclopedia, Aug. 28, 2008, pp. 1-8, Available at: <en.wikipedia.org/w/index.php?title=Touchscreen&direction=prev&oldid=234741814>.

* cited by examiner

COMBINING INTERFACES OF SHELL APPLICATIONS AND SUB-APPLICATIONS

BACKGROUND

Computer systems execute various types of software applications. Many of these software applications, known as "sub-applications," are created to provide specific functionalities to other, more comprehensive applications, known as "shell applications." For this reason, shell applications are said to "host" one or more sub-applications. For example, an electronic mail (e-mail) software program (e.g., MICROSOFT® OUTLOOK®) may use a plug-in to encrypt and decrypt e-mail messages. In such cases, the e-mail software program is referred to as the shell application, while the encryption and decryption plug-in is referred to as the sub-application. In another example, an operating system (OS) may use a word processing application and a spreadsheet application. In such cases, the OS is referred to as the shell application, while the word processing and spreadsheet applications are referred to as the sub-applications. In general, any application that hosts another application as described above may be referred to as a "shell application." Thus, a shell application may include an application that runs under an OS or may even include the OS itself. Similarly, any application that is hosted by another application may generally be referred to as a "sub-application."

Sub-applications do not operate independently of shell applications. Instead, sub-applications interact with a shell application using "services" provided by the shell application. These services provide the sub-applications with the protocol the sub-applications require to communicate with the shell application and to provide their respective functionalities to the shell application. If the services of the shell application are not available, the sub-applications are unable to operate. The sub-applications are thus said to be "dependent" on the shell application. Such dependency is undesirable because the process by which sub-applications are developed to be compatible with shell applications is costly, tedious and time-consuming.

Both the shell application and the sub-applications generate graphical data to be displayed on a system display. Because sub-applications are dependent on the shell application, both sub-application graphical data and shell application graphical data are displayed using a single graphical user interface (GUI) of the shell application. As explained above, elimination of the interdependency between shell applications and sub-applications is generally desirable. However, such elimination prevents the display of sub-application graphical data using the shell application's GUI. Thus, the sub-applications are left without an effective means by which to display their graphical data.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Disclosed herein is a technique that comprises independently executing shell and sub-applications while displaying GUI-based information for each of the shell and sub-applications on a common display. Specifically, GUI(s) associated with a sub-application are rendered (or superimposed) upon the GUI of the shell application. In this way, it appears to an end-user that the shell application is hosting the sub-application, although the applications are actually being executed independently. When the end-user interacts with the sub-application GUI that is superimposed on the shell application GUI, the shell application captures the user input and transfers it to the sub-application. Alternatively, the sub-application captures the user input directly. In either case, the shell application gives the illusion that it is hosting the sub-application, while in reality the shell application and sub-application are executed separately. Thus, the problems previously described are mitigated while maintaining transparency for the end-user. The technique described above is now further elucidated with reference to FIG. 1 below.

Figure 1:
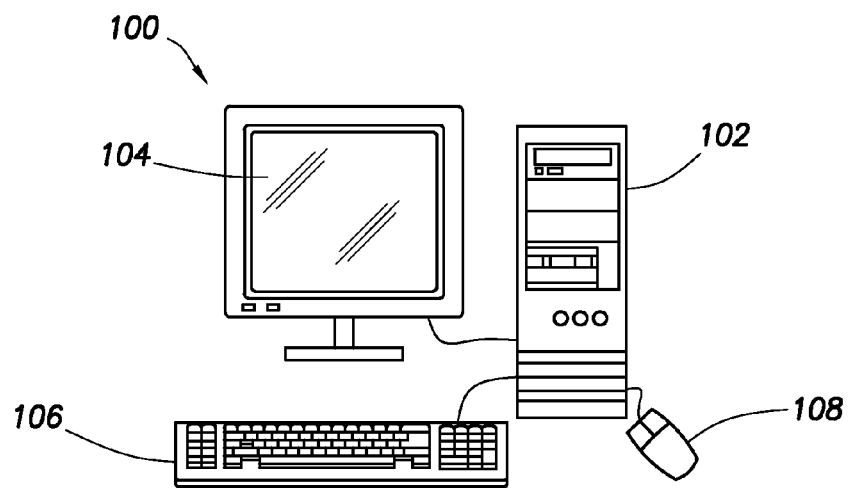
FIG. 1 shows an illustrative computer system implementing the techniques disclosed herein, in accordance with embodiments.

FIG. 1 shows a computer system 100 implementing the technique disclosed herein in accordance with various embodiments. The computer system 100 comprises a chassis 102, a display 104, a keyboard 106 and a mouse 108. Other input and/or output devices also may be used. Further, although the computer system 100 is described herein as being a desktop personal computer, the technique disclosed herein may be implemented in any suitable type of computer system, including notebooks/laptops, personal digital assistants, portable music players, mobile communication devices, and any and all electronic devices that are able to execute software programs.

Figure 2:
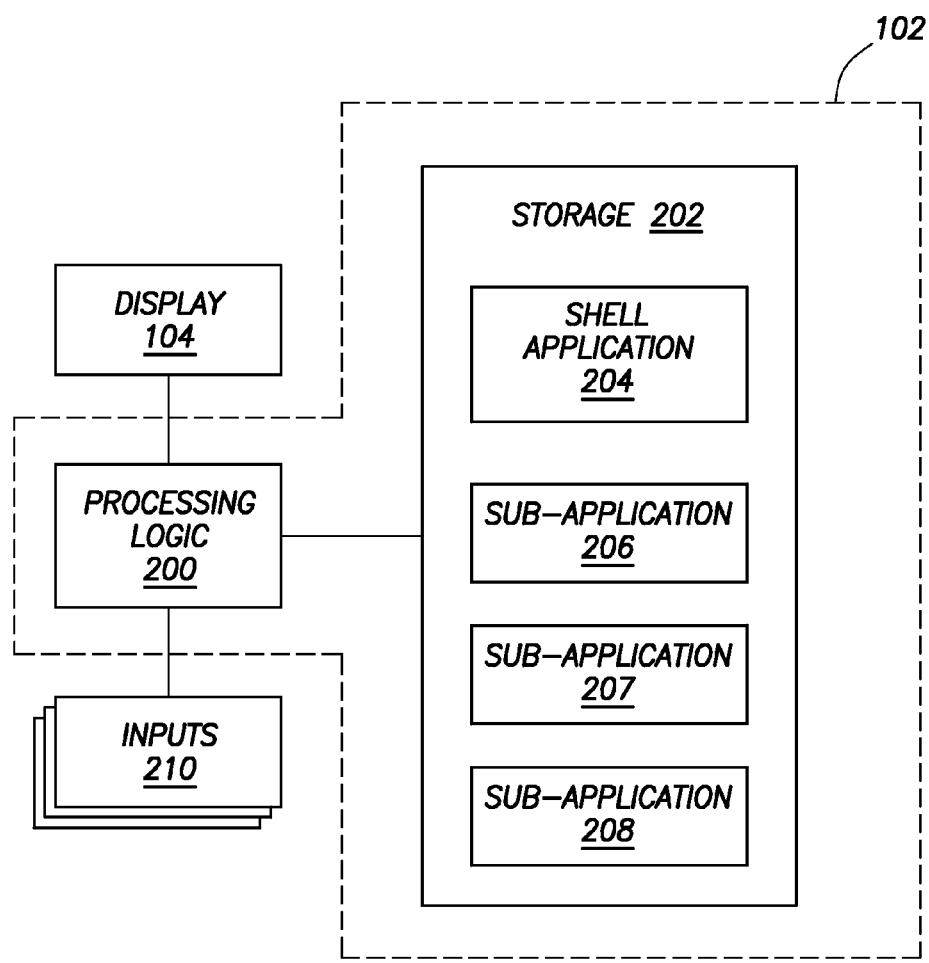
FIG. 2 shows an illustrative block diagram of circuit logic stored within the system of FIG. 1, in accordance with embodiments.
Figure 3A:
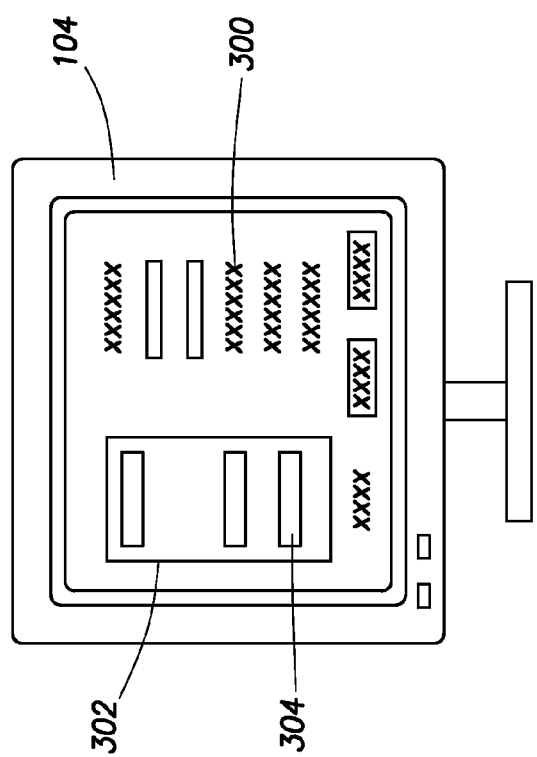
FIG. 3A shows an illustrative display and graphical user interface (GUI) associated with the system of FIG. 1, in accordance with embodiments.

FIG. 2 shows a detailed view of the contents of the chassis 102 of FIG. 1. Specifically, the chassis 102 comprises processing logic 200 and storage 202 (e.g., random access memory (RAM)) comprising a shell application 204 and multiple sub-applications 206-208. In at least some embodiments, the processing logic 200 includes a processor or a microprocessor with firmware embedded in on-board memory. The firmware may comprise software code which, when executed, enables the processing logic 200 to render GUIs on the display 104 using graphical data obtained by executing the shell application 204 and/or one or more of the sub-applications 206-208. The processing logic 200 may perform additional functions germane to the operations of the computer system 100. As previously mentioned, the chassis 102 couples to the keyboard 106 and mouse 108, which are generically referred to in FIG. 2 as input devices 210. The input devices 210 may comprise additional types of devices besides keyboards and mice, such as touch-screens, voice-activated input devices, etc. In some embodiments, the display 104 may be a touch-screen, in which case the display 104 may comprise both an output device and an input device 210. In operation, the processing logic 200 executes the shell application 204 and one or more of the sub-applications 206-208. For example, the processing logic 200 may execute the shell application 204 and the sub-application 206. The shell application 204 comprises software code which, when executed, causes the processing logic 200 to generate a GUI on the display 104. FIG. 3A shows such a GUI 300. The GUI 300 generated using the shell application 204 may be of any suitable type. The sub-applications 206-208 comprise software code which, when executed, cause the processing logic 200 to generate another GUI on the display 104. FIG. 3A shows such a GUI 302. As shown, the GUI 302 is superimposed upon the GUI 300. The GUIs 300 and 302 are independent of each other in the sense that the graphical data displayed using the GUI 300 is received directly from the shell application 204 and the graphical data displayed using the GUI 302 is received directly from one of the sub-applications 206-208. In some embodiments, however, graphical data from a sub-application 206-208 may be provided to the GUI 302 via the shell application 204.

In at least some embodiments, when executing the shell application 204, the processing logic 200 does not "host" the sub-application 206 using the shell application 204. Stated in another way, the shell application 204 and sub-application 206 are independent of one another such that the sub-application 206 does not "depend" on the shell application 204 for proper execution. Instead, the processing logic 200 executes the shell application 204 and the sub-application 206 separately, meaning that the shell application 204 and the sub-application 206 run in their own process space independently such that memory and other resources are not shared (or at least are shared to a lesser degree than if the techniques disclosed herein were not implemented). The shell application 204 and sub-application 206 can be executed independently of each other because the shell application 204 is not programmed to require sub-application 206 to adhere to any specific protocol in order to communicate with the shell application 204. Thus, the shell application 204 does not provide the "services" described above to the sub-application 206, nor does the sub-application 206 require services in order to provide its functionalities to the shell application 204.

For example, a shell application 204 may comprise an OS and a sub-application 206 may comprise a word-processing application. Instead of providing the word-processing application with services with which to communicate with the OS, the OS is specifically programmed (e.g., by a manufacturer) to accept communications from the word-processing application regardless of whether any particular communication protocol is followed. In this way, the interdependence between the OS and the word-processing application is eliminated.

However, as previously explained, such an elimination of the interdependence between the shell application 204 and the sub-application 206 is problematic in that it leaves the sub-application 206 without an effective means by which to display its graphical data. In at least some embodiments, such a problem is mitigated as follows. When executed, the sub-application 206 causes the processing logic 200 to produce one or more GUIs 302, as shown in FIG. 3A. The processing logic 200 renders these GUI(s) 302 onto the GUI 300 using any suitable technique or technology, such as MICROSOFT® VISTA® Desktop Window Manager (DWM). Because the sub-application's GUI(s) 302 are superimposed onto the shell application's GUI 300, it appears to a user who is viewing the display 104 that the shell application 204 is hosting the sub-application 206. However, as previously explained, the shell application 204 is not hosting the sub-application 206; instead, the processing logic 200 is rendering the sub-application's GUI(s) 302 onto the shell application's GUI 300 to create the illusion that the shell application 204 is hosting the sub-application 206. This illusion facilitates user transparency and ease-of-use.

In some embodiments, the GUI(s) 302 of the sub-application may be passive. For example, a GUI 302 may be displayed simply for aesthetic enhancement of the GUI 300 (e.g., as ornamentation). In contrast, some embodiments may provide an end-user of the computer system 100 with an opportunity to interact with the GUI(s) 302, thereby enabling the GUI 302 to provide one or more functionalities to the GUI 300 and the shell application 204. For example, a GUI 302 may comprise a "fillable" form that includes several fields 304 into which text may be entered, as shown in FIG. 3A. In another example, the GUI 302 may comprise one or more buttons that may be clicked using a mouse cursor. In yet another example, the display 104 may be a touch-screen display, and so the GUI 302 may comprise touch-sensitive areas that receive user input via a stylus, finger, etc. Any and all such variations are included within the scope of this disclosure.

In such embodiments, the end-user may provide input to the computer system 100 in response to the GUI(s) 302 displayed to the end-user. In turn, the processing logic 200 may capture such user input and may provide the input to the shell application 204, the sub-application 206, or both. In some embodiments, the processing logic 200 may provide the user input to the shell application 204 which, in turn, may provide the user input to the sub-application 206. In yet other embodiments, the processing logic 200 provides the user input directly to the sub-application 206 which, in turn, may optionally provide the user input to the shell application 204.

For example, assume that the shell application 204 comprises software used to place orders for goods, and further assume that the sub-application 206 comprises a plug-in that is usable by the shell application 204 to generate and save order forms. Accordingly, the shell application 204 provides a primary GUI upon which the sub-application's secondary GUI is imposed, or rendered. It appears to the end-user that the shell application 204 is hosting the sub-application 206, although, as explained above, this is not the case. The end-user uses the keyboard 106 and mouse 108 to enter information into the fields of the order form of the secondary GUI. For example, the end-user may enter a name, billing address, credit card number, etc. Once the end-user is finished entering information into the order form, the end-user may click "Save" or a similar button to indicate that the order form is complete. As a result, in some embodiments, the processing logic 200 may provide the data directly from the shell application 204 to the sub-application 206. In other embodiments, the processing logic 200 may cause the data to be provided from the end-user to the secondary GUI and provided directly to the sub-application 206, thus bypassing the shell application 204.

A sub-application may receive user input directly from the end-user or from the end-user by way of the shell application. Various techniques may be used to implement either of these methods. For example, in some embodiments, a section of the shell application's GUI that contains dynamic displays may be "removed" and made transparent. The transparent portion of the shell application GUI may then be replaced with the sub-application's GUI (e.g., using WINDOWS® VISTA® DWM), thereby enabling the end-user to enter information directly into the sub-application's GUI. In some embodiments, the shell application's GUI (or dynamic display window) may be completely transparent. The sub-application's GUI may then be rendered in the same position as (or "behind") the shell application's GUI. In this way, the end-user is enabled to enter information directly into the sub-application's GUI. In some embodiments, a chromeless sub-application GUI may be sized and superimposed upon part or all of the shell application's GUI, thereby enabling the end-user to provide input directly to the sub-application's GUI. Any and all such variations are encompassed within the scope of this disclosure.

Figure 3B:
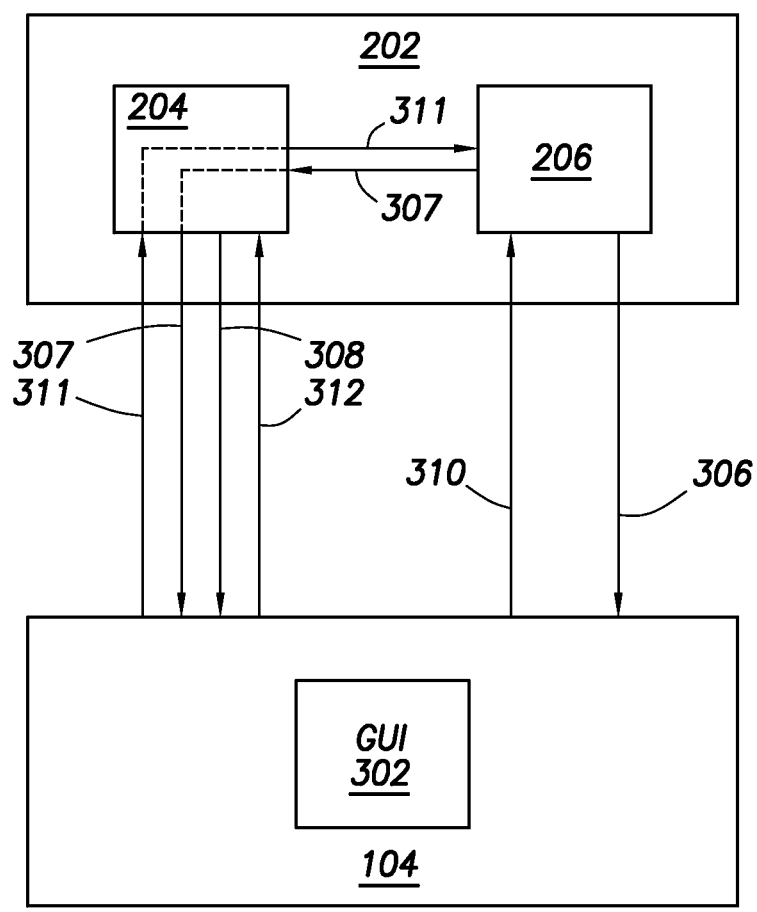
FIG. 3B shows a conceptual diagram demonstrating the operation of techniques disclosed herein, in accordance with embodiments.

FIG. 3B shows a conceptual diagram of the techniques disclosed herein in operation. The storage 202 comprises the shell application 204 and the sub-application 206. Graphical data generated using the sub-application 206 is transferred directly to the display 104 and is displayed using GUI 302, as indicated by arrow 306. By "directly," it is meant that the processing logic 200 causes the graphical data to be transferred from the sub-application 206 to the GUI 302 without first providing the graphical data to the shell application 204. However, in some embodiments, the graphical data may be transferred from the sub-application 206 to the GUI 302 via the shell application 204 (i.e., the graphical data is transferred "indirectly") as indicated by arrows 307. Likewise, graphical data generated using the shell application 204 is transferred directly to the display 104 and is displayed using GUI 300, as indicated by arrow 308. The shell application 204 and the sub-application 206 are executed independently of each other, as explained above, such that the shell application 204 does not provide "services" to the sub-application 206. Also, as explained, the graphical data from the sub-application 206 may be provided directly to the GUI 302 using any suitable technique or technology, such as WINDOWS® VISTA® PWM.

Still referring to FIG. 3B, data input into the GUI 302 (e.g., by an end-user), including mouse clicks, touches (if the display 104 is a touch-screen), text, etc. may be provided directly from the GUI 302 to the sub-application 206, as indicated by arrow 310. By "directly," it is meant that the processing logic 200 causes the user input to be transferred from the GUI 302 to the sub-application 206 without first providing the user input to the shell application 204. However, in some embodiments, the user input may be transferred "indirectly" to the sub-application 206 via the shell application 204 as indicated by arrows 311. Similarly, user input provided to the GUI 302 may be transferred directly to the shell application 204, as indicated by arrow 312.

Regardless of the particular technique used to display sub-application GUIs on the display 104, in at least some embodiments, the sub-application GUIs may be refreshed at a regular, predetermined rate or at an irregular rate. Further, the shell application and sub-applications may share a common resource, such as an eXtensible Application Markup Language (XAML) file or an eXtensible Markup Language (XML) file, each of which may specify a theme that enables the GUIs on the display 104 to have a unified look and feel.

Although the illustrative embodiments are described above in terms of a single sub-application and a shell application, in some embodiments, any number of sub-application(s) and/or shell application(s) may be used. For example, the GUI of a single shell application may have superimposed upon it the GUIs of multiple sub-applications. In another example, the GUIs of multiple shell applications may be simultaneously displayed on the display, each shell application GUI having superimposed upon it any number of sub-application GUIs.

The technique described herein is implemented in discrete computer systems (i.e., computer systems whose components are not linked by a network connection). Thus, for example, the shell application and sub-application(s) may be stored on the same storage device or on multiple storage devices, all of which are housed within a common chassis. In at least some embodiments, the shell application and sub-application(s) are not stored on storage devices that are communicably coupled via one or more networks (e.g., the Internet, wide local area networks (WLAN)). For instance, the technique may be implemented on a discrete computer system that includes a display, computer chassis, and input/output devices, on a discrete mobile communication system, etc.

Figure 4:
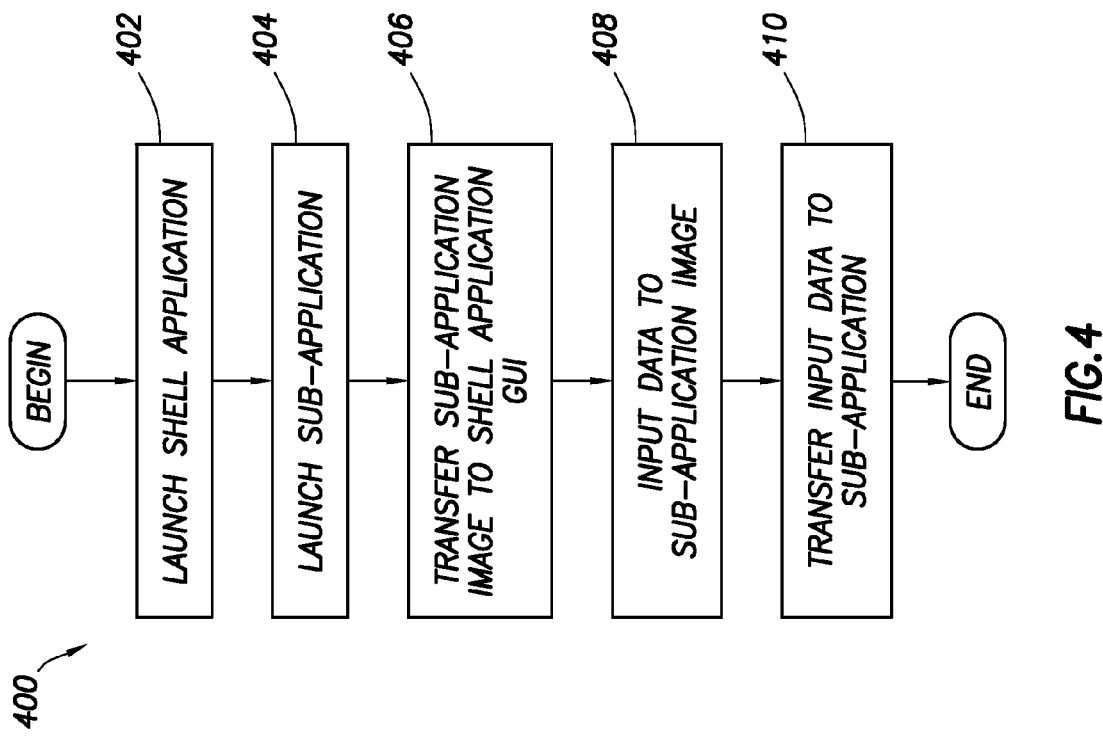
FIG. 4 shows a flow diagram of an illustrative method implemented in accordance with various embodiments.

FIG. 4 shows a flow diagram of a method 400 implemented in accordance with various embodiments. The method 400 begins by launching a shell application (block 402) and a sub-application (block 404). The method 400 continues by transferring a sub-application image (GUI) to the shell application or, in some embodiments, directly to the display itself (block 406). The method 400 then comprises providing user input data to the sub-application image (block 408). The method 400 also comprises collecting the input data and transferring the input data to the sub-application (block 410), either directly or via an indirect path that includes a shell application. The steps of the method 400 may be performed in any suitable order.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
   storage comprising a shell application and a sub-application, said sub-application is adapted to provide a functionality to the shell application; and
   processing logic coupled to the storage and adapted to execute the shell application and the sub-application;

wherein the processing logic generates a first graphical user interface (GUI) for the sub-application, the sub-application not using services of the shell application to display graphical data of the sub-application through the first GUI, and generates a second GUI for the shell application;

wherein the processing logic displays on a display the first GUI superimposed onto the second GUI;

wherein the processing logic captures input provided using the first GUI and provides said input to the sub-application.

2. The system of claim 1, wherein the sub-application comprises a plug-in usable by the shell application.

3. The system of claim 1, wherein the processing logic does not use a network connection to provide said input to the sub-application.

4. The system of claim 1, wherein the shell application does not host the sub-application when the processing logic generates the second GUI or when the processing logic provides the second GUI to a display.

5. The system of claim 1, further comprising a touch-screen display, wherein the touch-screen display displays the second GUI, and wherein the processing logic uses the touch-screen display to capture said input.

6. The system of claim 1, wherein the processing logic provides said input directly to the sub-application without first providing it to the shell application.

7. The system of claim 1, wherein the processing logic provides said input to the shell application, and wherein the processing logic provides said input from the shell application to the sub-application.

8. A system, comprising:
a display; and
storage comprising a shell application and a plug-in application usable to provide a functionality to the shell application;
wherein the display displays a graphical user interface (GUI) associated with the plug-in application while the display displays another GUI associated with the shell application;
wherein the system captures input using the GUI and provides said input directly to the plug-in application, the plug-in application not using services of the shell application to display graphical data of the plug-in application through the GUI.

9. The system of claim 8, wherein said shell application and the plug-in application are executed independently of each other such that failure of the plug-in application does not precipitate failure of the shell application.

10. The system of claim 8, wherein graphical data is provided directly from said plug-in application to the GUI, and wherein said input is provided directly to the plug-in application without first being provided to the shell application.

11. The system of claim 8, wherein the system comprises a device selected from the group consisting of a personal computer, a mobile communication device, a personal digital assistant and a portable music player.

12. The system of claim 8, wherein the display displays said GUI in place of a transparent portion of said another GUI.

13. The system of claim 8, wherein a network connection is not used to provide said input to the plug-in application.

14. The system of claim 8, wherein said display comprises a touch-screen that is used to capture said input.

15. A method, comprising:
displaying a first graphical user interface (GUI), the first GUI corresponds to a shell application;
displaying a second GUI superimposed upon the first GUI, the second GUI corresponds to a plug-in application usable to provide a functionality to the shell application, the plug-in application not using services of the shell application to display graphical data of the plug-in application through the second GUI;
providing input to the second GUI; and
transferring the input from the second GUI to the plug-in application;
wherein the shell application does not host the plug-in application.

16. The method of claim 15, further comprising refreshing said second GUI at predetermined intervals.

17. The method of claim 15, wherein transferring the input from the second GUI to the plug-in application comprises transferring said input directly to the plug-in application.

18. The method of claim 15, wherein transferring the input from the second GUI to the plug-in application comprises first transferring said input to the shell application.

19. The method of claim 15, wherein displaying said first GUI and said second GUI comprises executing the shell application and plug-in application independently of each other.

20. The method of claim 15, wherein displaying said second GUI comprises using a display built into a device selected from the group consisting of a desktop computer, a notebook computer, a personal digital assistant, a mobile communication device, a portable music player and a touch-screen device.

* * * * *